(12) United States Patent
Väänänen

(10) Patent No.: US 8,406,746 B2
(45) Date of Patent: Mar. 26, 2013

(54) SERVER AND SUBSCRIBER TERMINAL FOR VOICEMAIL TRANSMISSIONS VIA PACKET SWITCHED DATA COMMUNICATION

(75) Inventor: Mikko Kalervo Väänänen, Helsinki (FI)

(73) Assignee: Dot Assets No. 14 LLC, Wilmington, DE (US)

( * ) Notice: Subject to any disclaimer, the term of this patent is extended or adjusted under 35 U.S.C. 154(b) by 0 days.

(21) Appl. No.: 13/297,643

(22) Filed: Nov. 16, 2011

(65) Prior Publication Data

US 2012/0066327 A1    Mar. 15, 2012

Related U.S. Application Data

(60) Continuation of application No. 11/730,209, filed on Mar. 30, 2007, now Pat. No. 8,086,222, which is a division of application No. 10/344,995, filed as application No. PCT/FI01/00701 on Aug. 8, 2001, now Pat. No. 7,218,919.

(30) Foreign Application Priority Data

Aug. 21, 2000  (FI) ..................................... 20001838

(51) Int. Cl.
 *H04M 11/00* (2006.01)
(52) U.S. Cl. .................. 455/413; 455/412.1; 455/412.2; 455/414.2; 379/88.01; 379/88.12; 379/88.22
(58) Field of Classification Search .............. 455/412.1, 455/413; 379/88.12, 88.22
See application file for complete search history.

(56) References Cited

U.S. PATENT DOCUMENTS

| | | | |
|---|---|---|---|
| 5,239,679 A | 8/1993 | Murai | |
| 5,742,666 A | 4/1998 | Alpert | |
| 5,742,905 A | 4/1998 | Pepe et al. | |
| 5,950,123 A | 9/1999 | Schwelb et al. | |
| 6,032,039 A | 2/2000 | Kaplan | |
| 6,038,199 A | 3/2000 | Pawlowski et al. | |
| 6,058,303 A | 5/2000 | Åstrom et al. | |
| 6,112,233 A | 8/2000 | Xu | |
| 6,138,158 A | 10/2000 | Boyle et al. | |
| 6,252,517 B1 | 6/2001 | Parvulescu et al. | |
| 6,266,340 B1 | 7/2001 | Pickett et al. | |
| 6,351,523 B1 | 2/2002 | Detlef | |

(Continued)

FOREIGN PATENT DOCUMENTS

| | | |
|---|---|---|
| DE | 19 58 126 | 5/1971 |
| EP | 0 845 894 | 6/1998 |

(Continued)

OTHER PUBLICATIONS

"User's Manual", Nokia Mobile Phones, No. 9357168, Issue 3 EN, 1999.

(Continued)

*Primary Examiner* — Dwayne Bost
*Assistant Examiner* — Gerald Johnson

(57) ABSTRACT

The invention relates to a voicemail short messaging method (10, 20, 30) and means and a subscriber terminal (500). In particular it concerns a method and means for instantaneous packet switched voicemail between Internet compatible computers, personal digital assistants, telephones and mobile stations. In particular the inventive subscriber terminal (500) concerns a hardware and a software setup that allows the combined use of audio and/or video devices (550) with both the normal cellular or fixed telephony network (520) and with an Internet connection (510). The inventive subscriber terminal (500) allows the flexible use of both the Internet and telephony network with numerous advantages, one of which is the inventive voicemail short messaging method under study. The inventive voicemail messaging method (10), comprising at least one subscriber terminal is characterised by server independence.

24 Claims, 8 Drawing Sheets

U.S. PATENT DOCUMENTS

| | | | |
|---|---|---|---|
| 6,385,306 B1 | 5/2002 | Baxter, Jr. | |
| 6,400,958 B1 | 6/2002 | Isomursu et al. | |
| 6,442,242 B1 | 8/2002 | McAllister et al. | |
| 6,466,654 B1 * | 10/2002 | Cooper et al. | 379/88.01 |
| 6,553,220 B1 * | 4/2003 | Marks | 455/413 |
| 6,563,912 B1 | 5/2003 | Dorfman et al. | |
| 6,611,516 B1 | 8/2003 | Pirkola et al. | |
| 6,643,034 B1 | 11/2003 | Gordon et al. | |
| 6,650,901 B1 | 11/2003 | Schuster et al. | |
| 6,725,256 B1 | 4/2004 | Albal et al. | |
| 6,747,989 B1 | 6/2004 | Sevanto | |
| 6,757,531 B1 * | 6/2004 | Haaramo et al. | 455/414.1 |
| 6,763,226 B1 | 7/2004 | McZeal, Jr. | |
| 6,772,233 B2 | 8/2004 | Iida et al. | |
| 6,826,407 B1 | 11/2004 | Helferich | |
| 6,842,772 B1 | 1/2005 | Delaney et al. | |
| 6,907,113 B1 | 6/2005 | Holm et al. | |
| 6,978,127 B1 | 12/2005 | Bulthuis et al. | |
| 7,289,792 B1 | 10/2007 | Turunen | |
| 2001/0005675 A1 | 6/2001 | Aho | |
| 2001/0034767 A1 | 10/2001 | Aho | |
| 2001/0039589 A1 | 11/2001 | Aho et al. | |
| 2002/0086662 A1 * | 7/2002 | Culliss | 455/413 |
| 2002/0152266 A1 | 10/2002 | Burfeind et al. | |
| 2003/0063580 A1 | 4/2003 | Pond | |
| 2004/0259531 A1 | 12/2004 | Wood et al. | |
| 2005/0020250 A1 | 1/2005 | Chaddha et al. | |
| 2005/0287993 A1 | 12/2005 | Gogic | |
| 2006/0003745 A1 | 1/2006 | Gogic | |

FOREIGN PATENT DOCUMENTS

| | | |
|---|---|---|
| EP | 1 033 861 | 9/2000 |
| EP | 1 056 268 | 8/2002 |
| EP | 0 794 650 | 12/2004 |
| EP | 1 429 511 | 4/2007 |
| FI | 19992774 | 6/2001 |
| FI | 20000249 | 8/2001 |
| FI | 20000785 | 10/2001 |
| FI | 108982 | 4/2002 |
| JP | 08-032618 | 2/1996 |
| JP | 08-125603 | 5/1996 |
| JP | 11-275205 | 10/1999 |
| WO | WO-97/41654 | 11/1997 |
| WO | WO-98/44709 | 10/1998 |
| WO | WO-99/51048 | 10/1999 |
| WO | WO-99/66746 | 12/1999 |
| WO | WO 00/02367 A1 * | 1/2000 |
| WO | WO-00/30374 | 5/2000 |
| WO | WO-00/38340 | 6/2000 |

OTHER PUBLICATIONS

C. Zhu, "RIP Payload Format for H.263 Video Streams", Intel Corporation, ftp://ftp.isi.edu, Sep. 1997.
Chawea et al., "Transmission of Streaming Video Over an EGPRS Wireless Network", New York, NY, V. 1 (2000), pp. 275-278.
Communication for EP application No. 01 958 126.3, dated Dec. 17, 2007.
Communication for EP application No. 01 958 126.3, dated Dec. 30, 2005.
Communication for EP application No. 01 958 126.3, dated Feb. 13, 2007.
Communication for EP application No. 01 958 126.3, dated Jun. 2, 2008.
Communication for EP application No. 01 958 126.3, dated Jun. 8, 2005.
Communication for EP application No. 01 958 126.3, dated May 29, 2006.
Communication for EP application No. 01 960 808.2, dated Sep. 29, 2006.
Decision of the Board of Appeal of the national Board of Patents and Registration of Finland for Patent No. 110297, Issued in Helsinki on Dec. 4, 2007.
Final Rejection Decision on Japanese Application 2002-522210, dispatched Feb. 1, 2011 (with English translation).
Finnish Search Report for Application 20001838, dated Nov. 2, 2001.
First Office Action for Chinese application No. 01816921, issued on Oct. 28, 2005.
Gruhl et al., "A Demonstrator for Real-Time Multimedia Sessions Over 3rd Generation Wireless Networks", New York, NY, V. 2 (2000), pp. 959-962.
Harry Newton, "Newton's Telecom Dictionary", New York, Mar. 1998, pp. 526-529.
Index of /Nokia/Install.1, pp. 1-9, printed Oct. 29, 2004.
International Preliminary Examination Report for PCT/FI2001/00701 completed on Dec. 11, 2002.
International Preliminary Examination Report for PCT/FI2001/00732, completed on Dec. 11, 2002.
International Search Report for PCT/FI2001/00701 mailed on Nov. 13, 2001.
International Search Report for PCT/F12001/00732 mailed on Nov. 27, 2001.
Internet Article, "Mr. Facility's Guide to: How to Get Audio Over the Web", V.1.2, Oct. 1, 1996, http://www.ducksbreath.com/ducks/warmup/tips.htm, pp. 1-13.
Internet article, "Nokia Introduces the World's first High-Speed Data Terminal for Wireless Networks", Nokia Connecting People, Jun. 21, 1999, http://press.nokia.com/PR/199906/776767.sub.-5.html, pp. 1-2.
Internet Article, "Welcome to this NOKIA9000/9110 Page", https://anten/fol/n1/nokia/nokia/html, 5 pages, printed Apr. 27, 2004.
Internet Article, https://xesife001.nokia.com/exchange/EXT-PWF.Patent-Agency/Inbox/Fw:%20Suinn, 15 pgs., printed May 25, 2004.
Jarkko Sevanto, "Multimedia Messaging Service for GPRS and UMTS", New Orleans, LA, V. 3, 1999, pp. 1422-1426.
Martin H. Weik, DSC., "Communications Standard Dictionary", Second Edition, Dynamic Systems, Inc., Resont, Virginia, 1989, pp. 768-769.
Mikko Vaananen, "Memo Regarding 'International Application No. PCT/FI2001/00701'", Helsinki, Finland, May 2002.
Nokia Mobile Phones, User's Manual, No. 9357168, Issue 3 EN, 1999.
Non-Final Office Action on U.S. Appl. No. 11/730,209, mailed Mar. 2, 2011.
Notice of Allowance on U.S. Appl. No. 11/730,209, mailed Aug. 18, 2011.
Notice of Allowance on U.S. Appl. No. 12/109,770, mailed Jan. 31, 2011.
Office Action for Japanese Application 2002-522210, issued Jul. 6, 2010.
Office Action on U.S. Appl. No. 12/109,770, mailed Jul. 16, 2009.
Final Office Action on U.S. Appl. No. 11/730,209, mailed May 24, 2010.
Non-Final Office Action on U.S. Appl. No. 11/730209, mailed Nov. 13, 2009.
Non-Final Office Action on U.S. Appl. No. 12/109,770, mailed Mar. 4, 2009.
Press Releases "Nokia introduces its second generation communicator—The pocket-sized Nokia 9110 Communicator combines an ultimate mobile office with a superb phone", Internet—http://press.nokia.com, 1998.
RealNetworks Inc., "Delivering Realaudio.RTM. or Real Video.RTM. from a Web Server",.RealNetworks Technical Blueprint Series, Seattle, WA, 1998.
Schulztinne et al., "RTP: A Transport Protocol for Real-Time Applications", Audio-Video Transport Working Group; GMD Focus; Precept Software,; Xerox Palo Alto Research Center; Lawrence Berkeley National Laboratory, ftp://ftp.isi.edu, Jan. 1996.
Written Opinion # 1 for PCT/FI2001/00701 mailed on Jul. 10, 2002.
Written Opinion # 2 for PCT/FI2001/00701 mailed on Nov. 19, 2002.
Written Opinion for PCT/FI2001/00732, mailed on Aug. 22, 2002.
Written Opinion for PCT/FI2001/00732, mailed on Nov. 19, 2002.
Non-Final Office Action on U.S. Appl. No. 13/161887, mailed Jan. 18, 2013.
European Search Report issued on European Application 09153558.3, mailed Jan. 16, 2013.

* cited by examiner

US 8,406,746 B2

SERVER AND SUBSCRIBER TERMINAL FOR VOICEMAIL TRANSMISSIONS VIA PACKET SWITCHED DATA COMMUNICATION

CROSS-REFERENCE TO RELATED PATENT APPLICATIONS

This application is a Continuation of U.S. application Ser. No. 11/730,209, filed Mar. 30, 2007 now U.S. Pat. No. 8,086,222, which is a Divisional of Ser. No. 10/344,995, filed Jul. 28, 2003, (now U.S. Pat. No. 7,218,919), which is a National Stage application of PCT/FI01/00701, filed Aug. 8, 2001, which claims the benefit of Finnish application 20001838, filed Aug. 21, 2000, all of which are incorporated herein by reference in its entirety.

BACKGROUND OF THE INVENTION

The invention relates to a voicemail short messaging method and means and a subscriber terminal. In particular it concerns a method and means for instantaneous voice mail between Internet compatible computers, personal digital assistants, telephones and mobile stations. In particular the inventive subscriber terminal concerns a hardware and a software setup that allows the combined use of audio and/or video devices with both the normal cellular or fixed telephony network and with an Internet connection.

Prior art packet switched voicemail features methods where the voicemail is delivered between GPRS and/or UMTS mobile stations. The voicemail messages are sent to an IP-address or an ISDN address. One prior art packet switched voicemail method is described in the WO 00/02367 publication, which is taken here as reference.

Prior art subscriber terminals typically do not allow the seamless interplay of the same audio and/or video devices with both the Internet connection and the telephony network connection. For example, WAP-compatible mobile phones lack the facility to use the telephony audio devices when browsing the Internet.

The prior art has several disadvantages. Firstly the prior art method is only applicable for sending voicemail between a limited number of devices, i.e. mobile stations. Second, the use of P-address or ISDN-address is conceptually difficult. It is also technologically difficult, especially in cases where the receiver does not have a permanent IP-address, but rather a dynamic one. Thirdly, a specific voicemail central server is an essential requirement for the prior art method. This introduces unnecessary network hardware.

Prior art mobile subscriber terminals do not allow the use of audio features with the Internet connection. This limits the facility to arrange IP conferences, make Internet calls, operate hyperlinks and send and reproduce packetized audio/video data, such as voicemail, seamlessly.

SUMMARY OF THE INVENTION

The purpose of the invention is to remove the aforementioned disadvantages. The present inventive method allows voicemail to be sent directly to telephone numbers in a flexible manner from both software applications and mobile stations. The inventive method and means allows instantaneous voicemail to be sent and received from and to any Internet compatible device on the basis of the telephone number of that device, or other directory information of that device. There will only be an optional need for a central server storing the messages.

IP-conferences and Internet calls maybe arranged with the telephony audio devices in accordance with the inventive subscriber terminal. Likewise, voice hyperlinks are easy to operate with the same audio devices. The transmission, reception and reproduction of packet switched voice mail will also be seamless with the subscriber terminal in accordance with the invention.

In addition, the purpose of the invention is to introduce a favourable inventive user interface and method for exchanging voicemail seamlessly and instantaneously between IP-addresses, email-addresses, telephone numbers, and/or ISDN addresses.

Most or all of the aforementioned advantages of the invention are preferably implemented with a special exemplary embodiment of the invention, in which a recipient is chosen from the electronic phone book of a mobile station by pressing a button. The button is held down as the message is being dictated. The dictation is recorded in packet switched format to a data file on the mobile station or on a server in the network or on the Internet, in which case there will be a communications connection open to the server from the mobile station. Once the button is released the recording is finished and the data file will be sent to the recipient. Compression and cryptography methods may be employed with the data file and/or the packet stream. The data file may be sent either to the telephone number of the recipient directly, or to an IP-address of the recipient through the Internet by a variety of transmission protocols, such as TCP-, IP-, UDP-, H323-, HTTP-SMS-, MMS- or any other protocol or message delivery service. The IP-address of the recipient may be found from a central lookup server on the basis of the telephone number of the recipient, name or other information. Likewise, the telephone number may be found on the basis of the IP-address or other information related to the recipient by querying the lookup server.

Once the data file has been received, it can be played immediately at the mobile station of the recipient by pressing a button The user may also reply to the voicemail immediately with another recording. If the recipient mobile station cannot be reached, the message may be stored on a central server in the network or on the Internet for an indefinite time. If the receiving terminal is unable to play the recorded format, it may also be adapted on the central server to a suitable packet switched data format, or alternatively it can be played down the phone line to the recipient through a voice or a data connection.

In some preferable embodiments the voice message is streamed to the recipient through the Internet in real time, and the receiver may play it in real time. In some embodiments the subscriber terminal is a virtual software telephone in a PC. This software is preferably compatible to communicate with the mobile stations directly. The communication with the messages outlined here is faster than with contemporary SMS-messages, emails or telephone calls as the user neither has to write the messages with an often limited keyboard, nor has to wait for the recipient to answer on the other end. Very fast voicemail "ping-ball" is made possible by the outlined preferred embodiment of the invention.

Most or all of the aforementioned advantages of the invention are preferably implemented with a special exemplary embodiment of the inventive subscriber terminal, in which the audio and video software of the subscriber terminal has the ability to control both the Internet and normal telephony network connections. This allows the arrangement of IP-conferences by a setup signal that is transmitted through the telephony network. This allows seamless transmission; reception and processing of packet switched voicemail between both mobile stations, PCs and other terminals. The inventive software allows seamless IP-conferences between PC's and mobile stations. It also allows the efficient deployment of voice hyperlinks from the subscriber terminal. In some preferable embodiments it also allows least cost routing. Choices of whether to form IP-conferences or route through a normal telephony carrier can be made on the basis of economic and quality of service (QoS) criteria with this inventive subscriber terminal and related software, in some preferable embodiments.

A voicemail messaging method, comprising at least one subscriber terminal characterised by the steps of,
choosing at least one message recipient or a group,
recording at least one voice/video message,
writing at least one recording to at least one data file,
transmitting at least one data file to at least one recipient via telephony network or the Internet, A voicemail messaging method, comprising at least one subscriber terminal, characterised by the steps of,
choosing at least one message recipient or a group,
recording at least one voice/video message,
streaming data packets to at least one recipient via telephony network or the Internet,
at least one recipient receives and/or reassembles packet stream, A voicemail messaging method, comprising at least one subscriber terminal, characterised by the steps of,
choosing at least one message recipient,
recording at least one voice/video message,
writing at least one recording to at least one data file,
decomposing at least one data file into IP-packets,
streaming packets to at least one recipient via telephony network or the Internet.

A subscriber terminal, comprising a software, an Internet connection and/or a telephony network connection in accordance with the invention is characterized in that,
the software is arranged to transmit and receive data and/or record and/or play files using both the Internet and/or the telephony network connection simultaneously or at separate times,
the software is arranged to use some or all of the same audio and/or video devices with both of the connections.

A network server comprising at least one media player, at least one dialer, at least one telephony connection and/or at least one data network connection in accordance with the invention is characterised in that,
the network server is arranged to receive, store and forward undelivered messages or copies of messages in data file format,
the network server is arranged to resend and/or reroute messages to directories, to at least one other server or voicemail box electronically in file format, and/or by playing the message down the phone line with at least one media player to at least one recipient and/or voicemail box.

A client terminal, comprising recipient contact information, at least one telephony and/or Internet connection means, media recorder, and a user interface, and audio and/or video recording and/or reproduction means, characterised in that,
at least one dedicated action from the user interface indicates at least one message recipient or a group of recipients from the associated recipient contact information and arranges the media recorder to record an audio and/ or a video signal from the audio and/or video recording and/or reproduction means to a data file, which data file is further sent, played and/or reproduced to at least one indicated recipient using the said telephony and/or Internet connection.

BRIEF DESCRIPTION OF THE DRAWINGS

In the following the invention will be described in greater detail with reference to exemplary embodiments in accordance with the accompanying drawings, in which.

DETAILED DESCRIPTION OF THE PREFERRED EMBODIMENTS

Figure 1:
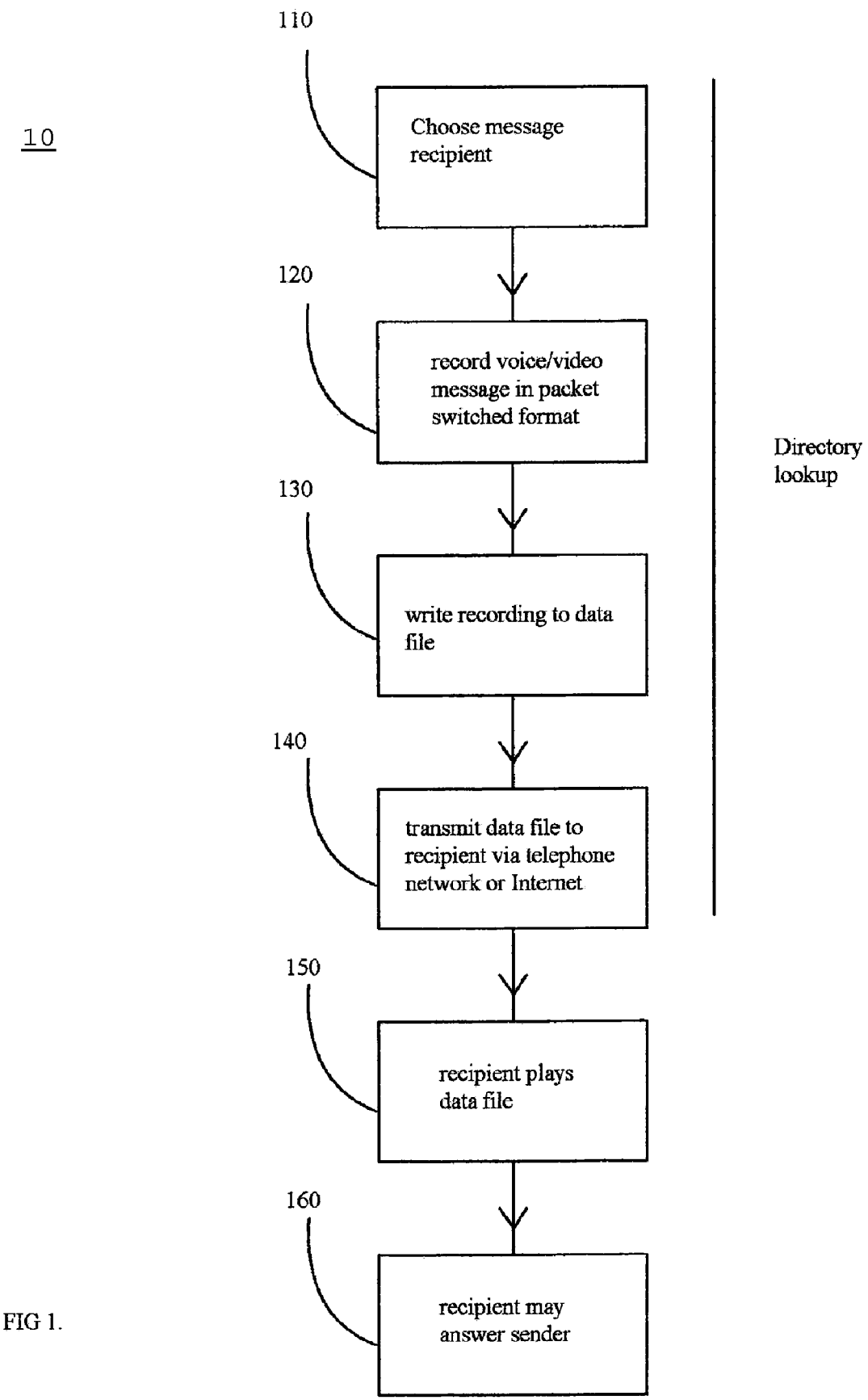
FIG. 1 presents a method 10 in accordance with the invention as a flow diagram.

In phase 110 of FIG. 1 the message recipient is chosen. The recipient may be chosen by labeling the recipient with a pointer from the "contacts" file of the terminal device, the recipient may be chosen by speech recognition, a dedicated keyboard accelerator, hot key, dedicated key or any combinations or permutations of these in some embodiments. Several recipients or a group may also be selected in some embodiments. In phase 120 the voice/video message is recorded in packet switched format, but other formats are also possible in some embodiments. In some embodiments the order of phases 110 and 120 may be reversed. Consequently, the recording is wrote to a data file, 130. During, in between or after any of these phases, directory lookup maybe executed in some preferable embodiments. The telephone number of the recipient is converted to an IP-address in one preferable embodiment. A prior art solution to directory lookup and conversion is presented in my patent application "Telenetwork directory template", FI19992774, which is taken here as reference.

In one alternative embodiment, the software in the subscriber terminal has the telephone number of the software application stored. Both the telephone number and the current IP-address are given to a central server. Telephone numbers and IP-addresses can then be used interchangeably when contact is made between software applications. This results to the effect that information in packet switched format can be readily transmitted to telephone numbers, provided these telephone numbers have a corresponding IP-address. Directory lookup is here established as the interchange retrieval and/or comparison of any directory information such as email-, IP-address, URL, ISDN number, phone number or the like to another corresponding email-, IP-address, URL, ISDN number, phone number or the like directory from the network, network server and/or terminal in order to deliver the message to a directory.

In phase 140 the data file is transmitted to the recipient via telephony network or the Internet. In some embodiments the subscriber terminal is a mobile station, and the messages are transmitted only on the condition that the radio field is adequate. In some embodiments attempts are made to send the message at various intervals, and if the attempt fails the message is postponed, typically for a further attempt. In many embodiments messages may be kept on standby for transmittal once favourable circumstances such as adequate network access, radio network access, radio signal strength, bandwidth, authentication or the like arise. Typically the transmission will be directed to an IP-address. Especially in cases where the IP-address of the recipient is a dynamic one, the directory lookup is an advantageous feature. In some embodiments where the recipient has a static IP address, the IP-address need not be looked up separately every time. In some preferable embodiments IP-addresses of recipients are stored on the subscriber terminal. In some embodiments only static IP-addresses of recipients are stored.

In some embodiments the message is sent by SS7-, GSM-, H323-, HTTP-, GSM-data, IP-RAN-, UMTS-, WAP-, Teldesic-, Inmarsat-, Iridium-, GPRS-, CDMA-data-, WCDMA-data-, HTTP-, H323-, SMS-, MMS-, email-LAN-, TCP/IP-, imode-, Globalstar- and/or WLAN-connection. In some embodiments the message is recorded in a file, which is attached to an email, which email is then sent to the recipients. In some embodiments, the message is recorded to a data file, which is then encoded to text format. This text is then pasted/written to the email, which email is then sent to the recipients. In some embodiments the recipients are capable of playing the message from the text format, for example by decoding the text format back to a data file, which data file can then be played with a media player, like WAV- or MP3-player. In some embodiments, messages may be sent to several recipients, a group or several groups or groups and individuals by sending several copies of the same file/message or otherwise.

In phase 150 the recipient plays the data file. In some embodiments the message is played automatically after it is received. This feature is user configurable in some embodiments. The recipient may answer sender directly in phase 160. This may be done by pressing a button after the data file has been played and dictating another data file, which will be sent to the initial sender as a reply. In some embodiments it is also possible to forward messages to other recipients or third parties. The data file is typically an MP3-, WAV- or RealSystem Secure data file in some preferable embodiments.

In one special embodiment the inventive method is arranged with a mobile station. In one embodiment the method is realized with a computer program that is arranged to run on the SIM card (Subscriber Identity Module) of the mobile station. The SIM card typically has a CPU, EEPROM-, ROM- and RAM-memories. In one phase of this special embodiment the message recipient, several recipients or a group may be chosen from the memory of the SIM card or from the memory of the mobile station, or it is inputted to the mobile station. When a dedicated action, such as pressing a button, is taken, a data file is recorded from the dictation, voice or video that is available. A media player/recorder located on the EEPROM and/or RAM of the SIM card or the memory of the mobile station typically does the recording of the file. In some embodiments the message itself is recorded to the RAM memory of the SIM card and/or the mobile station. After this the mobile station transfers the file to the recipient, to a secondary address of the recipient, or dials the telephone number of the recipient and plays the message as playback to the recipient when the call is answered or to the voicemail box if the call is answered by the voicemail box. The dialing of a data or a voice call may be realized from the SIM card as well in some embodiments using the proactive SIM feature of the SAT SIM Application Toolkit, which is specified in the phase 2+ of the GSM specification.

In some embodiments of the invention, a special prefix and postfix may be stored on the network, the SIM or the mobile station memory, and is played prior to the recording in the data file. The prefix and/or postfix could play for instance: "In the following you will hear a message from Mr. Jero Järvenpää." MESSAGE "This completed the message of Jero Järvenpää." The fact that the message was received could be detected in various ways in accordance with the invention. When the recipient or the voicemail box answers or hangs up, a DTMF tone may be transmitted and detected, which may be used to notify that the message was delivered. Alternatively the recipient could be asked to press a button or perform a dedicated action in order to signal that the message was indeed received and/or understood. If one or some of the recipients are unavailable, the message may be kept in memory and several other attempts to send the message may be taken. In some embodiments it is possible to set expiration conditions for the message, such as time, demands on memory by other functions, or various other conditions. In some embodiments the SIM and the mobile station may execute the method together, by for example the SIM performing the recipient selection and commands for forming or dialing connection, and the mobile station by providing a media player. Many prior art terminals already feature a MP3 player or the like.

Figure 2:
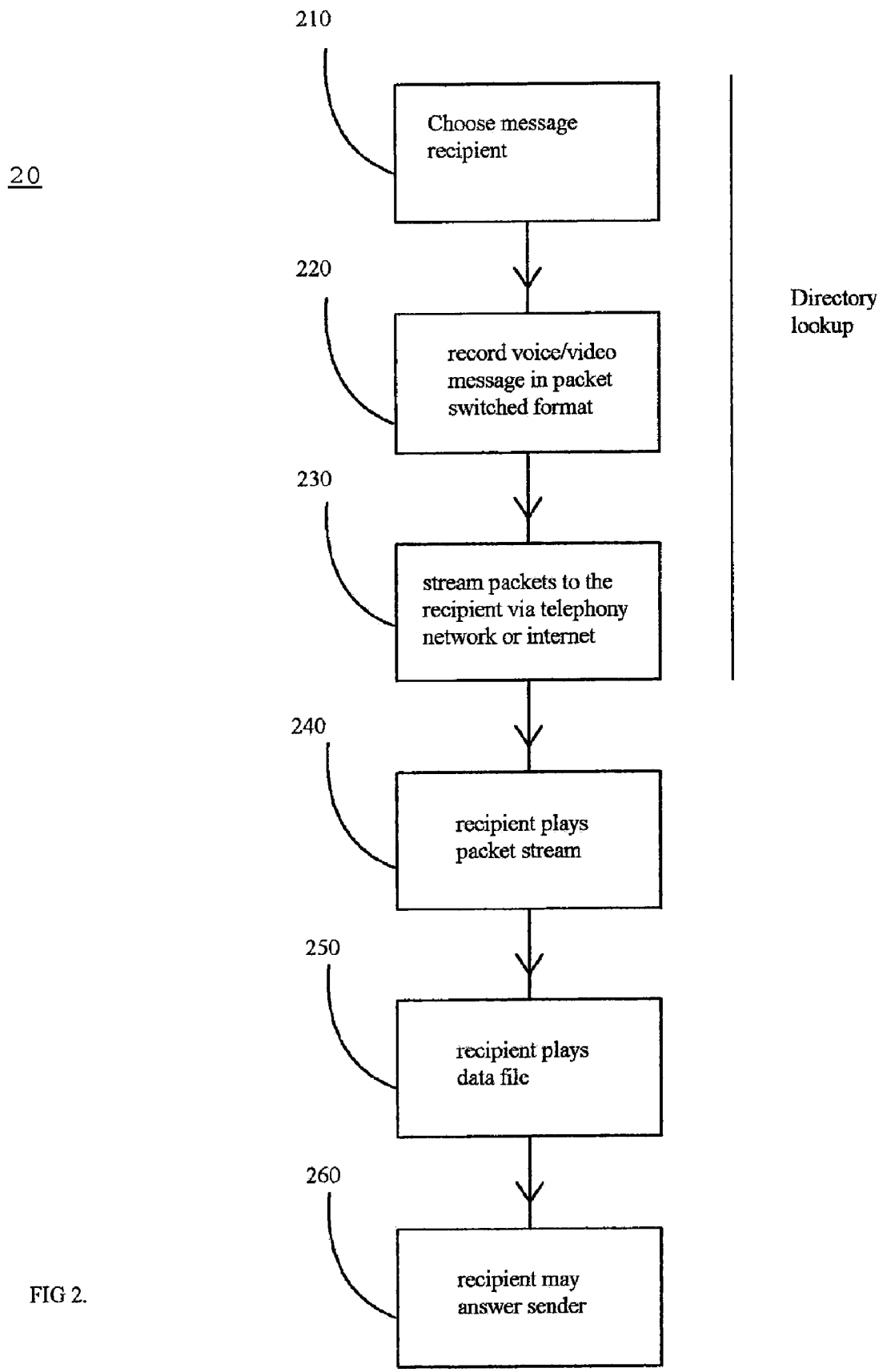
FIG. 2 presents another method 20 in accordance with the invention as a flow diagram.

In the phase 210 of FIG. 2 the message recipient is chosen by entering a telephone number or by choosing a name from an electronic phone book or the like. A recipient may be chosen on the basis of other directory information as well, for example on the basis of an IP-address. Following this, a voice/video message is recorded typically, but not necessarily in packet switched format in phase 220. In some embodiments the order of phases 210 and 220 may be reversed.

In phase 230 packets are streamed to the recipient via telephony network or the Internet. In some embodiments phases 230 and 210 may be concurrent. The recipient may receive the packet stream and play it in real time in phase 240. Alternatively, the recipient may also reassemble the packet stream to a data file in phase 240, which can be stored to the memory of the subscriber terminal and/or a server in the telephony network or on the Internet and played at a later time. Upon reception the recipient is given the opportunity to answer the sender in phase 260. In some embodiments, messages may be streamed to several recipients by sending several copies of the same packet stream.

During, in between or after any of the phases 210, 220, 230, directory lookup maybe executed in some preferable embodiments.

Figure 3:
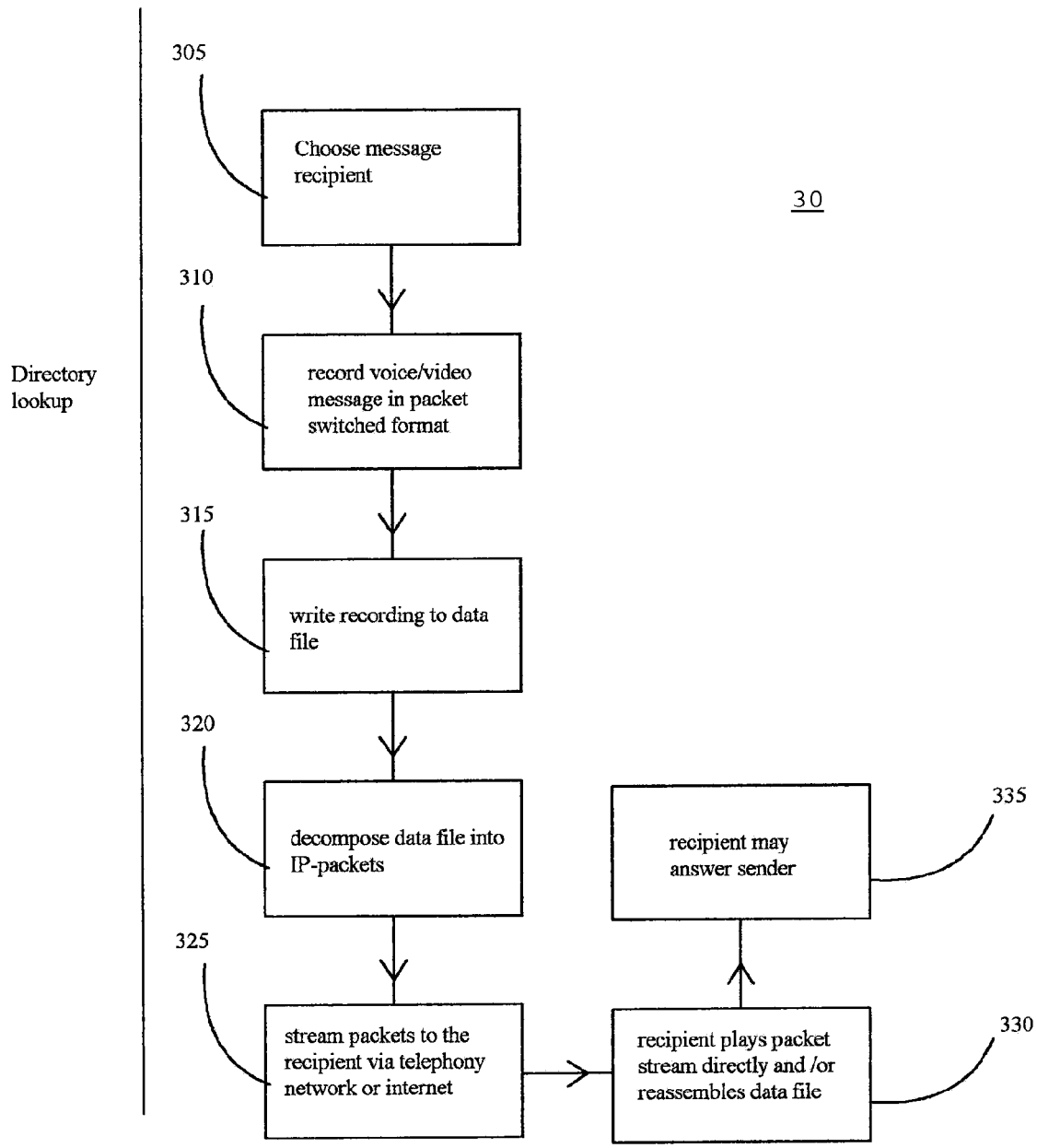
FIG. 3 presents a further method 30 in accordance with the invention as a flow diagram.

In the phase 305 of FIG. 3 the message recipient is chosen by entering a telephone number or by choosing a name from an electronic phone book or the like. Following this, a voice/video message is recorded in packet switched format in phase 310. In some embodiments the order of phases 305 and 310 may be reversed.

The recording is written to a data file in phase 315. Following this, the data file is decomposed into IP-packets in phase 320, or packets of any other information transmission protocol e.g. H323, HTTP. Packets are streamed to the recipient or multiple recipients or a group via telephony network or the Internet in phase 325. In many embodiments packet streams may be kept on standby, discontinued and then continued for transmittal once favourable circumstances such as adequate network access, radio network access, radio signal strength, bandwidth, authentication or the like arise.

During, in between or after any of these phases, directory lookup maybe executed in some preferable embodiments.

Recipient plays packet stream directly and/or reassembles the data file in phase 330. The recipient may receive the packet stream and play it in real time. In some embodiments the packet stream is played automatically. Alternatively, the recipient may also reassemble the packet stream to a data file in phase 330, which can be stored to the memory of the subscriber terminal and/or on a server in the telephony network or on the Internet and played at a later time. Upon reception the recipient is given the opportunity to answer the sender in phase 335.

The subscriber terminal is typically a mobile station equipped with an Internet connection and/or a telephony network connection. The mobile station typically abides to UMTS-, GSM-, WAP-, Teldesic-, Inmarsat-, Iridium-, GPRS-, CDMA-, HTTP-, H323-, SMS-, MMS-, and/or WCDMA-standards in some preferable embodiments. The subscriber terminal used in the method may also be a PC, PDA, Palm Computer or an Apple Macintosh computer equipped with an Internet connection and/or a telephony network connection in some preferable embodiments. The subscriber terminal in accordance with the invention has typically an operating system like Windows-, Windows NT-, Epoc-, Windows CE-, Unix-, Linux-, OS/2, Symbian, Epoc, PalmOS, Pocket PC, GEOS, MS-Stinger and/or Sybase. The execution of methods 10, 20, 30 is typically realised with a separate software application operating under the control of these operating systems. Alternatively, the execution of methods 10, 20, 30 may be realised with software that is integrated to any of the above operating systems. In some embodiments the execution of methods 10, 20, 30 and their favourable permutations and further embodiments may be realised by OEM software for mobile stations, modems, computers, radio, SIM cards and/or line cards. In some embodiments the execution of methods 10, 20, 30 may be realised with software that is integrated to any email client software, such as Microsoft Outlook, Outlook Express or the like. In some embodiments the execution of methods 10, 20, 30 may be realised with software that is developed using SAT (SIM Application Toolkit) or WTAI (Wireless Telephony Application Interface) of WAP (Wireless Application Protocol).

The information transfer in accordance with the inventive method follows a harmonious information transfer protocol, which is typically packet switched in some embodiments and compatible with the various hardware and software setups of the subscriber terminals. Typically different hardware setups of subscriber terminals have different client software programs, which are all intercompatible. For example in some preferable embodiments the data file is of MP3- or WAV-, Or RealSystem Secure format which is understood by all software programs residing in subscriber terminals in accordance with the invention. Various other compression methods may also be employed to produce the data file.

The subscriber terminals need also be compatible to handle the direct packet stream in accordance with the invention, in some preferable embodiments. This packet stream may be an IP—(Internet Protocol) multicasting, TCP—(Transmission Control Protocol) and/or UDP—(User Datagram Protocol) data stream. The data file may also be transmitted using these protocols or others in some preferable embodiments.

Provided the receiving subscriber terminal is incompatible to receive the transmitted format, the format may be adapted to the data format of the recipient at a central server in the telephony network, cellular network and/or on the Internet. If the recipient is unable to receive the voicemail the message may be stored on a central server for the time being. If the subscriber terminal is an analog phone, or otherwise unable to decipher and reproduce the data format of the voicemail, the voice mail can always be played down the phone line from the server as a last resort, For all cases where the recipient subscriber terminal cannot reproduce or store the message, a backup server may be designated in the transmission in some preferable embodiments. During, before, in between or after any of the phases of methods 10, 20, 30 or their permutations or embodiments an address tag, giving the IP-address, telephone number, email address or any other directory information of the backup server can be attached to the transmission. The backup server is found on the basis of this address tag in some preferable embodiments. In some embodiments the undeliverable message is routed to the voicemail box, email or some other directory of the recipient if the original delivery is unsuccessful. In some embodiments this address tag is demanded as the prerequisite for backup delivery.

Voice recognition may be employed during, before, in between or after any of the phases of methods 10, 20, 30. A Regret function may be employed during, before, in between or after any of the phases of methods 10, 20, 30 in order to destroy an unwanted intermittent or complete message. In some preferable embodiments, voice recognition is used to convert the dictation into a written email, SMS-, MMS-message or the like.

Figure 4:
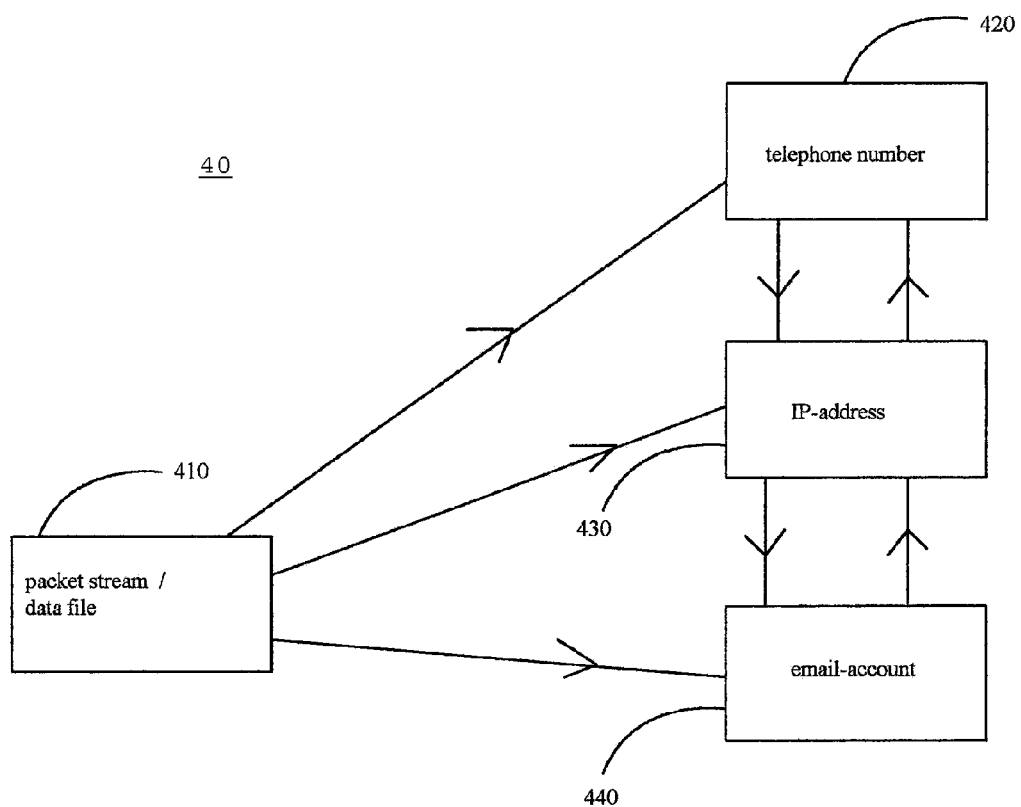
FIG. 4 presents a method of address allocation in accordance with the invention.

In FIG. 4 the packet stream and/or data file may be transmitted to the telephone number directly through the telephony network, for example using such protocols as SS7 and/or OTA (Over the Air) or as bursts or otherwise. In this case the recipient typically has a modem receiving the transmission in data mode. If the message cannot be delivered to the telephone number, it may be directed to the IP-address 430 of the recipient. The IP-address 430 may be looked up from a central server 450 in any phase of the process, before the transmission is began, after the failure of the reception to the telephone number or during the transmission. If an IP-address is unavailable, the voicemail may still be emailed to the email address of the recipient provided this is available. In some preferable embodiments the message may be directed to some other preferable electronic address, like the ISDN number, voicemail box, cellular voicemail box or another electronic address. All reroutings may be handled via at least one backup server in some embodiments.

Figure 5:
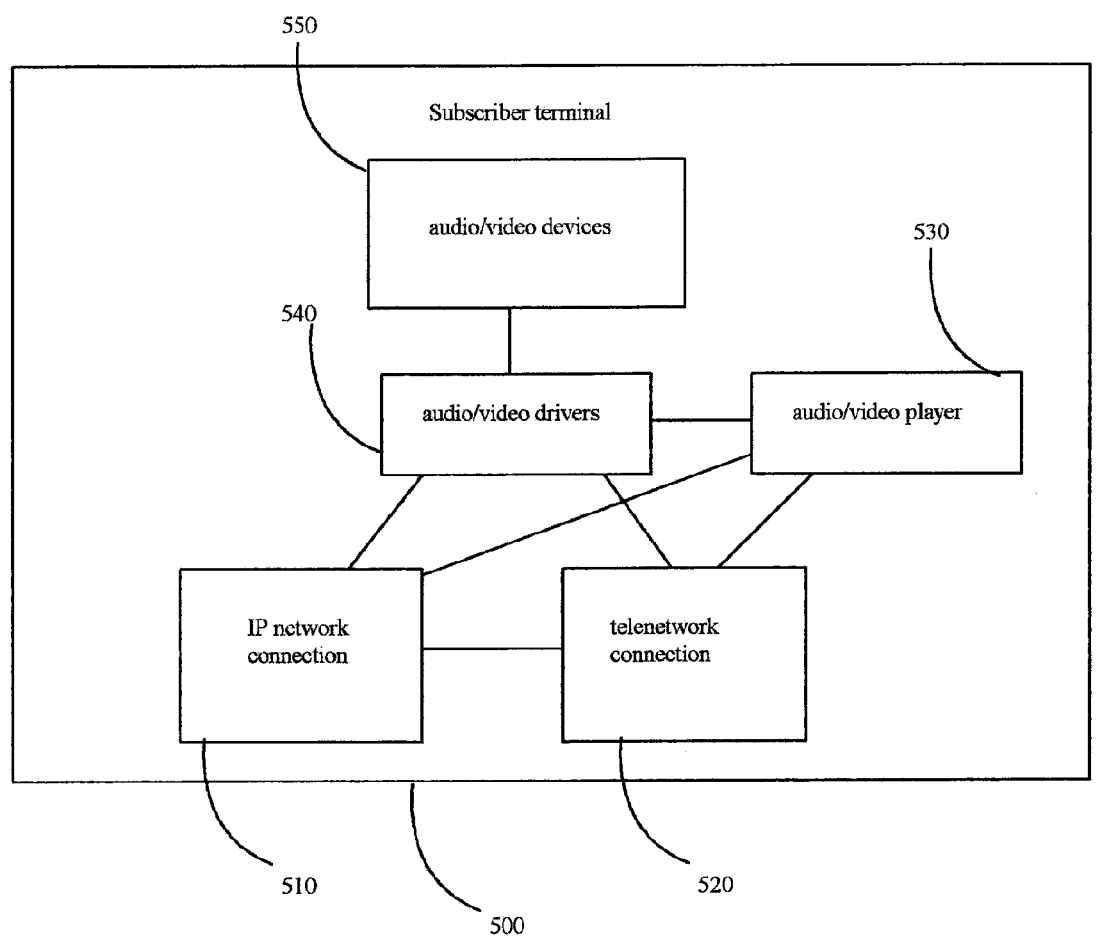
FIG. 5 presents an arrangement 50 of the subscriber terminal in accordance with the invention.

The subscriber terminal 500 of FIG. 5 in accordance with the invention comprises audio and/or video devices 550, like a microphone, speakers, a video camera and/or a digital camera. Audio/video devices 550 are controlled by software that typically incorporates or is able to use both the audio/video device drivers 540 and a media player 530. These software 540, 530 may transmit and receive data and/or record and/or play files using both the Internet and/or the telephony network connection simultaneously or at separate times in some preferable embodiments.

In one preferable embodiment of the inventive subscriber terminal in accordance with the invention, a free IP-conference may be arranged to be attempted first, and if this fails the call can be made through the telephony network with the cheapest or most reliable carrier as described in my patent application FI19960613, which is taken here as reference.

In one preferable embodiment a signal like an SMS-message, MMS-message, DTMF-tone, PING-signal or another signal may be used to initiate the subscriber terminal of this type to form an Internet connection to a specific IP-address.

An IP-conference can be set in this way in accordance with my patent application FI20000785, which is taken here as reference.

In one preferable embodiment of the inventive subscriber terminal in accordance with the invention, the software 530, 540 are arranged to operate voice hyperlinks in accordance with my patent application FI20000249, which is taken here as reference.

The subscriber terminal in accordance with the invention 500 also allows voicemail to be sent through both connections 510, 520. In some preferable embodiments the telephony network connection 520 is simply a voice connection and the audio/video player 530 is arranged to play the voice message to the recipient subscriber terminal, where it is recorded in some preferable embodiments. In this embodiment typically the telephone number is contacted.

In some preferable embodiments the IP network connection 520 is a data connection like a GSM-data, IP-RAN, TCP/IP, CDMA, GSM, GPRS, WCDMA, UMTS, Teldesic, Iridium, Inmarsat, IP-RAN, WLAN, Globalstar, DIGI-TV, SS7, HTTP, H323, IrDA, Bluetooth, NADC, PCS, JDC, ISDN and/or imode connection.

In a further advantageous embodiment there exists a common data-BUS to the audio and/or video devices from both the Internet connection and the telephony network connection. This way the same audio/video devices 550 may be used flexibly in IP-conferences, teleconferences, voicemail and/or packet switched voicemail. All these modes of operations and their permutations are controlled by the software 540, 530. The software 530, 540 is typically realised as a Windows-, Windows NT-, Epoc-, Windows CE-, Unix-, Linux-, OS/2, Symbian and/or Sybase application. It may also be realised as an integral part of any of the said operating systems.

In some preferable embodiments the software 530, 540 comprises also voice recognition software in accordance with the invention.

Figure 6:
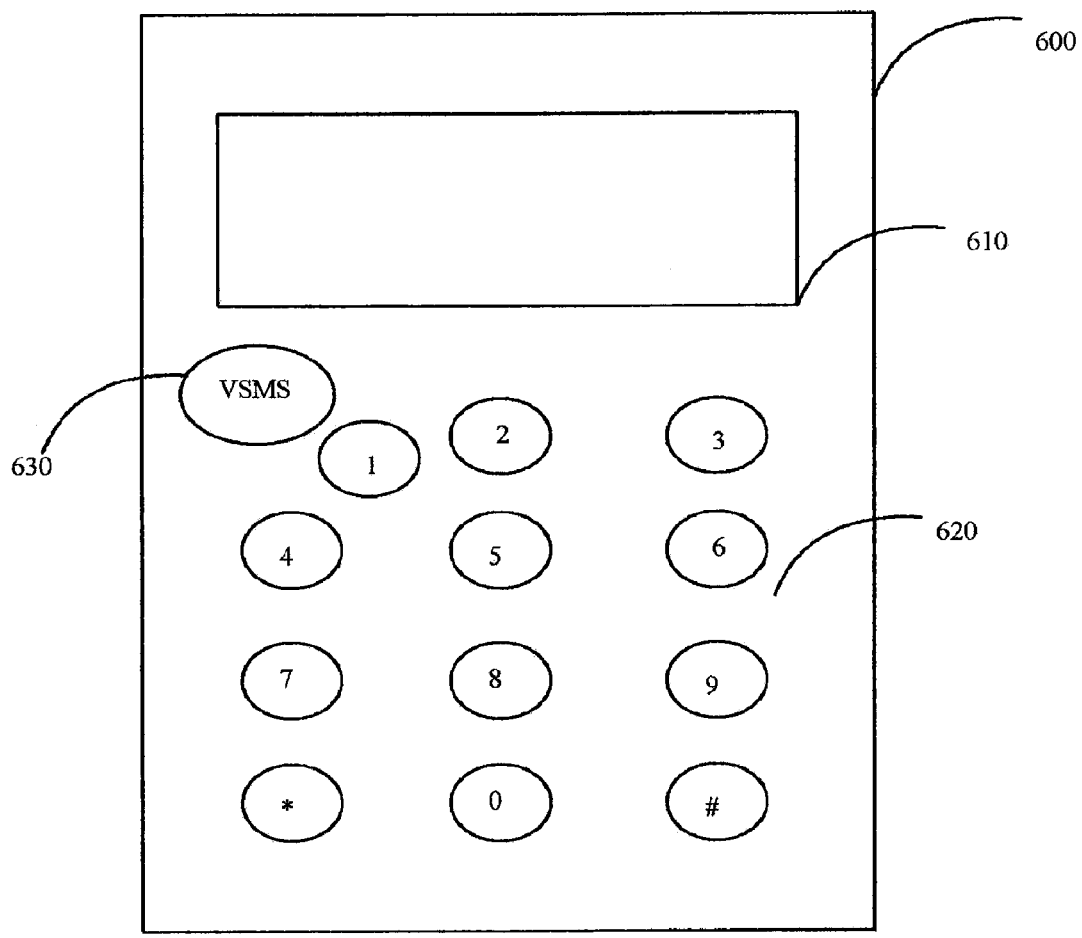
FIG. 6 presents an arrangement 60 of the user interface of the subscriber terminal in accordance with the invention.

In FIG. 6 the user interface 600 of a preferable subscriber terminal is illustrated. The user interface 600 is typically a PDA and/or a mobile stations front- or backend, or a virtual telephone on a PC screen. In one preferable embodiment, once the VSMS, or any other button or a combination of buttons is pressed, a recording is begun, and the message may be transmitted in accordance with the inventive methods 10, 20 and/or 30. The release of the VSMS button, or any other button or their combination may finish the recording and send the message in accordance with the invention. In some embodiments the buttons may be pressed physically or with a mouse pointer from a screen. In some embodiments separate dedicated keys, combinations of keys, shortcut keys, keyboard accelerators or the like are used to record and deliver messages. In some embodiments, dedicated keys, combinations of keys, shortcut keys, keyboard accelerators are used to record and deliver messages specifically to recipients to whom the dedicated keys, combinations of keys, shortcut keys, keyboard accelerators are dedicated to. For example, in one embodiment the button "9" or Ctrl+M could be used to record and deliver the message e.g. to the "M" other of the sender, i.e. mother of the sender. Naturally any other logical relationship between the hot key and the recipient is possible.

In one preferable embodiment the arrival of the message, or a packet stream containing the message may be indicated on the screen 610, or by flashing a light on the VSMS button or any other button or their combination. Once the recipient holds the button down the message is played from the audio devices of the subscriber terminal. In some preferable embodiments the inventive subscriber terminal features also an inbox for arrived messages.

In one embodiment the user interface 600 is the user interface of a mobile station. In one embodiment the method is realized with a computer program that is arranged to run on the SIM card (Subscriber Identity Module) of the mobile station. The SIM card typically has a CPU, EEPROM-, ROM- and RAM memories. In one phase of this special embodiment the message recipient, several recipients or a group may be chosen from the memory of the SIM card or from the memory of the mobile station, or it is inputted to the mobile station. When a dedicated action, such as pressing a button, is taken, a data file is recorded from the dictation, voice or video that is available. A media player/recorder is typically located on the EEPROM of the SIM card or the memory of the mobile station does the recording of the file. In some embodiments the message itself is recorded to the RAM memory of the SIM card and/or the mobile station After this the mobile station transfers the file to the recipient, to a secondary address of the recipient, or dials the telephone number of the recipient and plays the message as playback to the recipient when the call is answered or to the voicemail box if the call is answered by the voicemail box. The dialing of a data or a voice call may be realized from the SIM card as well in some embodiments using the proactive SIM feature of the SAT SIM Application Toolkit, which is specified in the phase 2+ of the GSM specification.

In some embodiments of the invention, a special prefix and postfix may be stored on the network, the SIM or the mobile station memory, is played prior to the recording in the data file. The prefix and/or postfix could play for instance: "In the following you will hear a message from Mr. Jero Järvenpää." MESSAGE "This completed the message of Jero Järvenpää." The fact that the message was received could be detected in various ways in accordance with the invention. When the recipient or the voicemail box answers or hangs up, a DTMF tone may be transmitted and detected, which may be used to notify the sender or the network that the message was delivered, e.g. with an SMS message of a flash message on the screen. Alternatively the recipient could be asked to press a button or perform a dedicated action in order to signal that the message was indeed received and/or understood. If one or some of the recipients are unavailable, the message may be kept in memory and several other attempts to send the message may be taken. In some embodiments it is possible to set expiration conditions for the message, such as time, demands on memory by other functions, or various other conditions. In some embodiments the SIM and the mobile station may execute the methods 10, 20, 30 or any permutation of these together, by for example the SIM performing the recipient selection and commands for forming or dialing connection, and the mobile station by providing a media player. Many prior art terminals already feature an MP3 player or the like.

Figure 7:
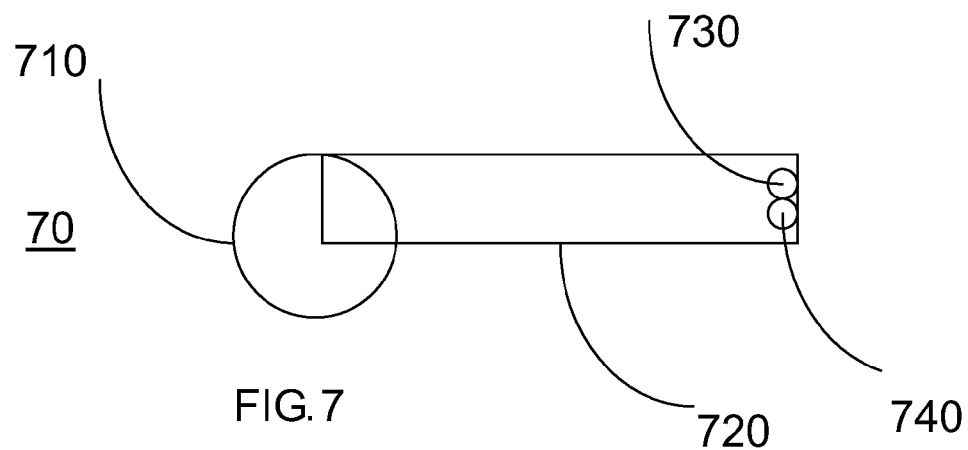
FIG. 7 presents another arrangement 70 of the user interface of the subscriber terminal in accordance with the invention.

FIG. 7 presents a special embodiment of the invention, which is typically realized as a software user interface on the screen of a terminal device. 720 is the display that shows who is/are the current recipients. The display 720 may simply list, scroll or otherwise display the current recipients of messages. In some preferable embodiments, the recipient may simply be manipulated by voice recognition. By pressing button 710 with a mouse pointer or some other pointer, the recording is begun. The recorder of the device records the message until the button is released, or pressed for a second time. When the recording is stopped, the message is sent to the recipients. In some embodiments the message is sent by GSM-data, IP-RAN-, UMTS-, WAP-, Teldesic-, Inmarsat-, Iridium-, GPRS-, CDMA-data-, WCDMA-data-, HTTP-, H323-, SMS-, MMS-, email-LAN- and/or WLAN-connection. In some embodiments the message is recorded in a file, which is attached to an email, which email is then sent to the recipients. In some embodiments, the message is recorded to a data file, which is then encoded to text format. This text is then pasted/written to the email, which email is then sent to the recipients. In some embodiments the recipients are capable of playing the message from the text format, for example by decoding the text format back to a data file, which data file can then be played with a media player, like WAV- or MP3-player.

In some embodiments, it is possible to utilize Autoplay upon reception. In this embodiment, the audio/video message is played automatically upon reception of the message. Typically, this means opening the file containing the message, and possibly employing decoding and/or decryption methods in some embodiments. In some embodiments where the message arrives by playback down the phone line, Autoplay is used to Auto answer these phone calls and play the call to the speaker(s) of the terminal.

Figure 8:
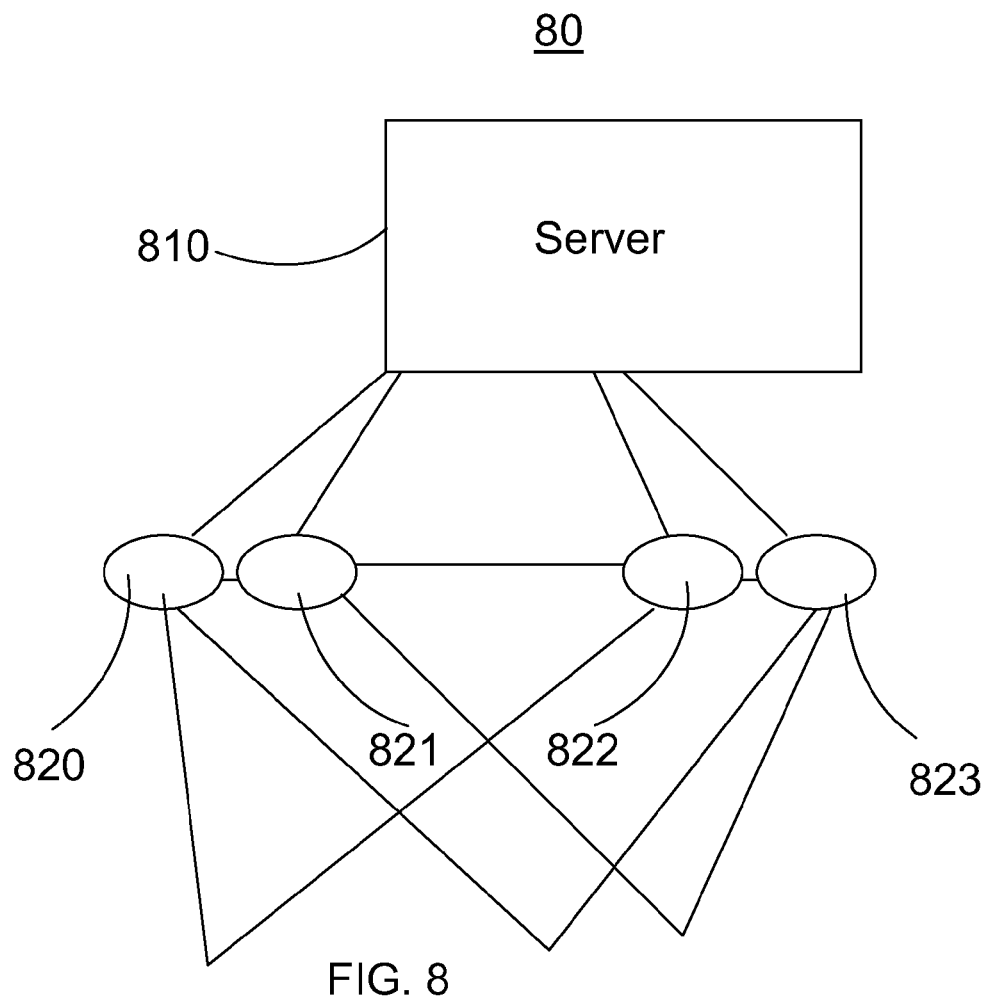
FIG. 8 presents another embodiment 80 of the backup server in accordance with the invention.

FIG. 8 present a special embodiment of the invention, utilizing a server for backup of messages. The messages are exchanged directly between the subscriber terminals 820, 821, 822, 823 in the first instance, but if a message is undeliverable it may be returned to the backup server 810 or to the sending terminal in some embodiments. Further attempts to resend or reroute to another directory, such as email, voicemail box, IP-address and/or telephone number may then be initiated from the server 810 or the original sending terminal. In some embodiments the server 810 may also be used for relaying messages. Upon delivery, or unsuccessful delivery acknowledgement messages may be fired from the receiving terminal e.g. 823 to the sending terminal e.g. 820, or to the backup server 810. Likewise, upon delivery or unsuccessful delivery acknowledgement messages may be fired from the backup server 810 to the sending terminal e.g. 820.

In some preferable embodiments the server 810 comprises a DBMS (Database Management System), a database, a dialer and a media player. Once the server 810 has the undelivered file containing the message, it will typically be stored in a database. The file may later be fetched from the database and be resent and/or rerouted in accordance with the invention. It is also possible to play the message to the recipient or to the recipient(s) voicemail box automatically, if the message cannot be delivered to the recipient(s) subscriber terminal. In some embodiments this is done automatically by the dialer dialing the telephone number of the recipient, then waiting for an answer, and then playing the message by a media player. Voice recognition may be employed in recognizing when the recipient has answered and is ready to listen to the message, typically after he has quit speaking, or the voicemail box has quit speaking and silence is detected. Direct file transfer to a file based voicemail box, or another backup server of the same type as 810 is also possible, by FTP, UDP, TCP/IP, HTTP, H323 or any other information transfer protocol. In some embodiments with a plurality of backup servers, the message is transferred to the backup server nearest to the recipient, or with the lowest latency to the recipient.

A Regret function may be employed during, before, in between or after any of the phases of methods 10, 20, 30 in order to destroy an unwanted intermittent or complete message, and it may be sent to the backup server 810 directly which will handle the message cancellation even when it has already been sent. In some embodiments, regret signals are sent even to the receiving terminal e.g. 823 and the message is destroyed upon receipt of the regret message on the receiving terminal, in some embodiments after the receiver has played the message or in some embodiments irrespective of this.

Figure 9:
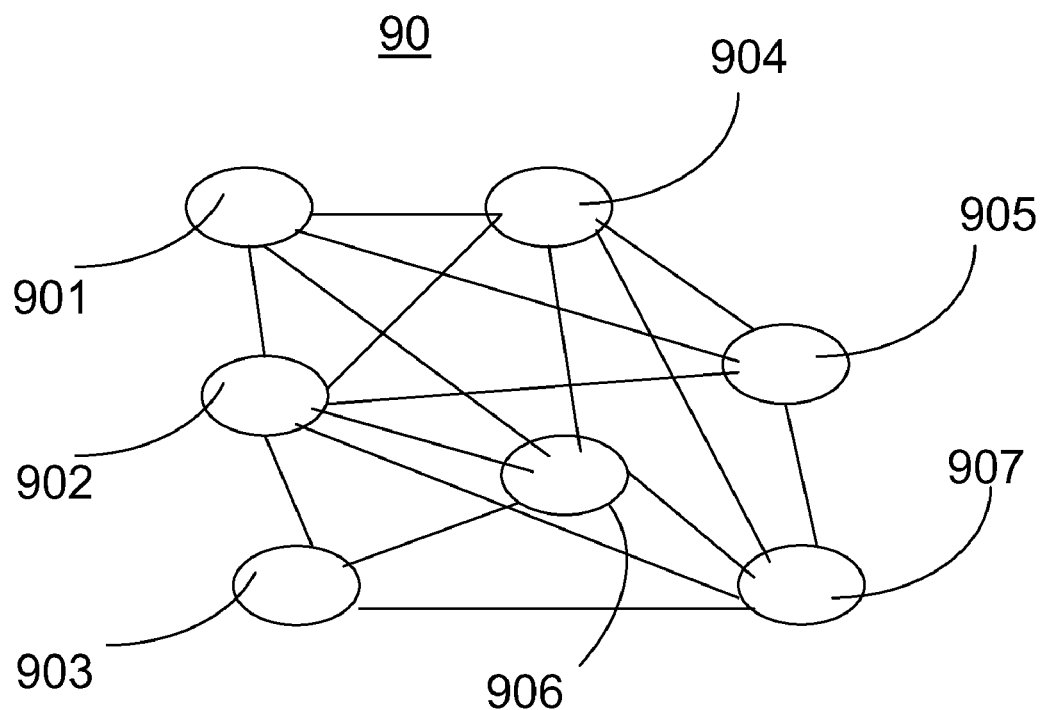
FIG. 9 presents another embodiment 90 of arranging the backup server in accordance with the invention in a distributed and persistent fashion.

FIG. 9 present a special embodiment of the invention, utilizing a Peer to Peer Server network. In this embodiment all or some of the clients at a terminal 901, 902, 903, 904, 905, 906, 907 may also operate as servers. In this embodiment, if a recipient client is unavailable, the message which cannot be delivered will be stored at some peer terminal 901, 902, 903, 904, 905, 906, 907. In some embodiments it will remain at the sender's terminal, and attempts to resend are made continuously or at regular intervals. In some embodiments, the undelivered message is stored at a peer terminal which is closest to the destination terminal.

The invention has been explained above with reference to the aforementioned embodiments, and several advantageous features of the invention have been demonstrated. The present inventive method allows voicemail to be sent directly to telephone numbers in a flexible manner from both software applications and mobile stations. The inventive method and means allows instantaneous voicemail to be sent and received from and to any Internet compatible device on the basis of the telephone number of that device. There will be only an optional need for a central server storing the messages. IP-conferences and Internet calls may be arranged with the telephony audio devices in accordance with the inventive subscriber terminal. Likewise, voice hyperlinks are easy to operate with the same audio devices. The transmission, reception and reproduction of packet switched voice mail will also be seamless with the subscriber terminal in accordance with the invention. This makes the exchange of short messages faster than with the SMS, as messages need not be written, and faster than a telephone call, as one does not have to wait the recipient to answer the telephone. All of these features allow greater flexibility and cost savings to the consumer, as free Voice & Video over IP may be practically employed.

For additional advantage the invention also introduces a favourable inventive user interface and method for exchanging voicemail seamlessly and instantaneously between IP-addresses, email-addresses, telephone numbers, and/or ISDN addresses.

The invention has been explained above with reference to the aforementioned embodiments. However, it is clear that the invention is not only restricted to these embodiments, but comprises all possible embodiments within the spirit and scope of the inventive thought and the following patent claims.

What is claimed is:

1. A method to provide a voicemail service, the method comprising:
   receiving at a messaging server at least one voicemail message from a first wireless mobile station and storing the at least one voicemail message in memory at the messaging server;
   establishing a packet switched data communication over a wireless telephony network with a recipient of the at least one voicemail message, wherein the recipient is a second wireless mobile station;
   transmitting over the packet switched data communication a copy of the at least one voicemail message to the second wireless mobile station to facilitate display of the at least one voicemail message in an inbox;
   maintaining the at least one voicemail message at the messaging server;
   determining that a data format of the at least one voicemail message is not reproducible by the second wireless station; and
   responsive to the determining that the data format is not reproducible, automatically establishing a telephone call between the messaging server and the second wireless mobile station such that the messaging server plays the at least one voicemail message for the second wireless mobile station during the telephone call.

2. The method of claim 1 wherein the transmitting the copy of the at least one voicemail message to the inbox is provided by attaching the at least one voicemail message to an email message.

3. The method of claim 1 wherein the wireless telephony network is part of the Internet.

4. The method of claim 1 wherein the inbox visually displays and lists a plurality of voicemail messages including the at least one voicemail message.

5. A voicemail messaging server, the messaging server comprising:
   circuitry configured to receive at least one voicemail message from a first wireless mobile station and memory to store the at least one voicemail message;
   circuitry configured to establish a packet switched data communication with a recipient of the at least one voicemail message, wherein the recipient is a second wireless mobile station;
   circuitry configured to transmit over the packet switched data communication a copy of the at least one voicemail message to the second wireless mobile station to facilitate display of the at least one voicemail message in an inbox;
   the memory configured to maintain the at least one voicemail message at the messaging server;
   circuitry configured to determine that a data format of the at least one voicemail message is not reproducible by the second wireless station; and
   circuitry to automatically establish, responsive to a determination that the data format is not reproducible, a telephone call between the messaging server and the second wireless mobile station, wherein the telephone call is established such that the messaging server plays the at least one voicemail message for the second wireless mobile station during the telephone call.

6. The voicemail messaging server of claim 5 wherein the circuitry configured to transmit the copy of the at least one voicemail message to the inbox is provided by attaching the at least one voicemail message to an email message.

7. The voicemail messaging server of claim 5 wherein the packet switched data communication is over the Internet.

8. The voicemail messaging server of claim 5 wherein the inbox visually displays and lists a plurality of voicemail messages including the at least one voicemail message.

9. A voicemail messaging server, the messaging server comprising:
   means for receiving at least one voicemail message from a first wireless mobile station and memory to store the at least one voicemail message;
   means for establishing a packet switched data communication with a recipient of the at least one voicemail message, wherein the recipient is a second wireless mobile station;
   means for transmitting over the packet switched data communication a copy of the at least one voicemail message to the second wireless mobile station to facilitate display of the at least one voicemail message in an inbox;
   means for storing the at least one voicemail message at the messaging server;
   means for determining that a data format of the at least one voicemail message is not reproducible by the second wireless station; and
   means for automatically establishing, responsive to a determination that the data format is not reproducible, a telephone call between the messaging server and the second wireless mobile station, wherein the telephone call is established such that the messaging server plays the at least one voicemail message for the second wireless mobile station during the telephone call.

10. The voicemail messaging server of claim 9 wherein the means for transmitting the copy of the at least one voicemail message to the inbox is provided by attaching the at least one voicemail message to an email message.

11. The voicemail messaging server of claim 9 wherein the packet switched data communication is over the Internet.

12. The voicemail messaging server of claim 9 wherein the inbox visually displays and lists a plurality of voicemail messages including the at least one voicemail message.

13. A method to provide a voicemail service, the method comprising:
   establishing a packet switched data communication over a wireless telephony network by a wireless mobile station;
   receiving at the wireless mobile station at least one voicemail message, provided from another wireless mobile station, from a messaging server over the packet switched data communication over the wireless telephony network;
   storing the at least one voicemail message in memory at the wireless mobile station, wherein the at least one voicemail message is also stored as a copy at the messaging server;
   displaying the at least one voicemail message in an inbox at the wireless mobile station; and
   responsive to a determination that a data format of the at least one voicemail message is not reproducible by the wireless mobile station, automatically, receiving a telephone call from the messaging server, wherein the messaging server plays the at least one voicemail message for the wireless mobile station during the telephone call.

14. The method of claim 13 wherein the at least one voicemail message is delivered as an attachment with an email message.

15. The method of claim 13 wherein the wireless telephony network is part of the Internet.

16. The method of claim 13 wherein the inbox visually displays and lists a plurality of voicemail messages including the at least one voicemail message.

17. A wireless mobile station, the wireless mobile station comprising:
   circuitry configured to establish a packet switched data communication over a wireless telephony network;
   circuitry configured to receive at least one voicemail message, provided from another wireless mobile station, from a messaging server over the packet switched data communication over the wireless telephony network;
   circuitry configured to store the at least one voicemail message at the wireless mobile station, wherein the at least one voicemail message is also stored as a copy at the messaging server;
   circuitry configured to display the at least one voicemail message in an inbox; and
   circuitry configured to automatically receive, responsive to a determination that a data format of the at least one voicemail message is not reproducible by the wireless mobile station, a telephone call from the messaging server, wherein the messaging server plays the at least one voicemail message for the wireless mobile station during the telephone call.

18. The wireless mobile station of claim 17 wherein the at least one voicemail message is delivered as an attachment with an email message.

19. The wireless mobile station of claim 17 wherein the wireless telephony network is part of the Internet.

20. The wireless mobile station of claim 17 wherein the inbox visually displays and lists a plurality of voicemail messages including the at least one voicemail message.

21. A wireless mobile station, the wireless mobile station comprising:
   means for establishing a packet switched data communication over a wireless telephony network;
   means for receiving at least one voicemail message, provided from another wireless mobile station, from a messaging server over the packet switched data communication over the wireless telephony network;
   means for storing the at least one voicemail message at the wireless mobile station, wherein the at least one voicemail message is also stored as a copy at the messaging server;
   means for displaying the at least one voicemail message in an inbox; and means for automatically receiving, responsive to a determination that a data format of the at least one voicemail message is not reproducible by the wireless mobile station, a telephone call from the messaging server, wherein the messaging server plays the at least one voicemail message for the wireless mobile station during the telephone call.

22. The wireless mobile station of claim 21 wherein the at least one voicemail message is delivered as an attachment to an email message.

23. The wireless mobile station of claim 21 wherein the wireless telephony network is part of the Internet.

24. The wireless mobile station of claim 21 wherein the inbox visually displays and lists a plurality of voicemail messages including the at least one voicemail message.

* * * * *

UNITED STATES PATENT AND TRADEMARK OFFICE
CERTIFICATE OF CORRECTION

PATENT NO. : 8,406,746 B2
APPLICATION NO. : 13/297643
DATED : March 26, 2013
INVENTOR(S) : Vaananen It is certified that error appears in the above-identified patent and that said Letters Patent is hereby corrected as shown below:

On Title Page 2, item (56), under "OTHER PUBLICATIONS", in Column 2, Line 34, delete "Vaananen," and insert -- Väänänen, --, therefor.

On Title Page 2, item (56), under "OTHER PUBLICATIONS", in Column 2, Line 49, delete "11/730209," and insert -- 11/730,209, --, therefor.

On Title Page 2, item (56), under "OTHER PUBLICATIONS", in Column 2, Line 58, delete "Server",.RealNetworks" and insert -- Server", RealNetworks --, therefor.

On Title Page 2, item (56), under "OTHER PUBLICATIONS", in Column 2, Line 62, delete "Software,; Xerox" and insert -- Software; Xerox --, therefor.

On Title Page 2, item (56), under "OTHER PUBLICATIONS", in Column 2, Line 68, delete "13/161887," and insert -- 13/161,887, --, therefor.

In the Drawings:

In Fig. 1, Sheet 1 of 8, delete "FIG 1." and insert -- FIG. 1 --, therefor.

In Fig. 2, Sheet 2 of 8, delete "FIG 2." and insert -- FIG. 2 --, therefor.

In Fig. 3, Sheet 3 of 8, delete "FIG 3." and insert -- FIG. 3 --, therefor.

In Fig. 4, Sheet 4 of 8, delete "FIG 4." and insert -- FIG. 4 --, therefor.

In Fig. 5, Sheet 5 of 8, delete "FIG 5." and insert -- FIG. 5 --, therefor.

In Fig. 6, Sheet 6 of 8, delete "FIG 6." and insert -- FIG. 6 --, therefor.

Signed and Sealed this
Twenty-seventh Day of August, 2013

Teresa Stanek Rea
*Acting Director of the United States Patent and Trademark Office*

CERTIFICATE OF CORRECTION (continued)
U.S. Pat. No. 8,406,746 B2

In the Specifications:

In Column 1, Line 44, delete "P-address" and insert -- IP-address --, therefor.

In Column 2, Line 38, delete "button" and insert -- button. --, therefor.

In Column 3, Line 3, delete "PC's" and insert -- PCs --, therefor.

In Column 3, Line 12, delete "terminal" and insert -- terminal, --, therefor.

In Column 3, Line 17, delete "Internet," and insert -- Internet. --, therefor.

In Column 3, Line 26, delete "stream," and insert -- stream. --, therefor.

In Column 5, Lines 24-25, delete "Teldesic-," and insert -- Teledesic-, --, therefor.

In Column 7, Line 20, delete "Teldesic-," and insert -- Teledesic-, --, therefor.

In Column 8, Line 8, delete "resort," and insert -- resort. --, therefor.

In Column 8, Line 38, delete "central server 450" and insert -- central server --, therefor.

In Column 9, Line 19, delete "Teldesic," and insert -- Teledesic, --, therefor.

In Column 10, Line 16, delete "station After" and insert -- station. After --, therefor.

In Column 10, Line 64, delete "Teldesic-," and insert -- Teledesic-, --, therefor.

In Column 11, Line 18, delete "present" and insert -- presents --, therefor.

In Column 11, Line 66, delete "present" and insert -- presents --, therefor.

In the Claims:

In Column 16, Lines 2-8, in Claim 21, delete "means for.......telephone call." and insert the same at Line 3, as a new sub-point.